United States Patent
Hardjono (12) Patent No.: US 6,182,214 B1
(45) Date of Patent: Jan. 30, 2001

(54) EXCHANGING A SECRET OVER AN UNRELIABLE NETWORK

(75) Inventor: Thomas P. Hardjono, Arlington, MA (US)

(73) Assignee: Bay Networks, Inc., Santa Clara, CA (US)

(*) Notice: Under 35 U.S.C. 154(b), the term of this patent shall be extended for 0 days.

(21) Appl. No.: 09/227,237

(22) Filed: Jan. 8, 1999

(51) Int. Cl.[7] .................................................. G06F 1/24
(52) U.S. Cl. .................... 713/163; 713/178; 713/200; 713/201; 380/36; 380/25.5; 380/274
(58) Field of Search .................... 713/163, 178, 713/189, 200, 201; 380/255, 274, 36, 37

(56) References Cited

U.S. PATENT DOCUMENTS

| | | | |
|---|---|---|---|
| 5,659,615 | 8/1997 | Dillon | 380/21 |
| 5,748,736 | 5/1998 | Mittra | 380/21 |

OTHER PUBLICATIONS

"Applied Cryptography," 1996, John Wiley & Sons, New York, XP002137412, pp. 71–73 and pp. 528–531.

Schneier, Bruce, "Applied Cryptography, Second Edition, Protocols, Algorithms, and Source Code in C", pp. 71–73 and pp. 528–531.

Ballardie, Tony, et al, "Core Based Trees (CBT), An Architecture for Scalable Inter–Domain Multicast Routing", pp. 85–95.

McCanne, Steven, et al, "Receiver–driven Layered Multicast", pp. 117–130.

*Primary Examiner*—Thomas R. Peeso
(74) *Attorney, Agent, or Firm*—Bromberg & Sunstein LLP (57) ABSTRACT

Threshold cryptography (secret sharing) is used for exchanging a secret between a server and a client over an unreliable network. Specifically, a secret is computationally divided into N shares using a threshold encryption scheme such that any M of the shares (M less than or equal to N) can be used to reconstruct the secret. The N shares are spread over a number of transmitted messages, with the assumption that some number of the messages including a total of at least M shares will be received by the client. Upon receiving at least M shares, the client uses the at least M shares to reconstruct the secret using the threshold encryption scheme.

42 Claims, 5 Drawing Sheets

EXCHANGING A SECRET OVER AN UNRELIABLE NETWORK

FIELD OF THE INVENTION

The present invention relates generally to communication networks, and, more particularly, to exchanging a secret over an unreliable network.

BACKGROUND OF THE INVENTION

In today's information age, communication networks are becoming ever more pervasive as more and more communication consumers utilize on-line services to access information over the communication network. With this increased use of communication networks comes a need for security, and specifically for ensuring that the information is accessed by only those communication consumers that are authorized to do so.

One problem in many communication networks is that any information transmitted across the network is susceptible to interception by unintended and unauthorized entities. Therefore, encryption is often used to prevent those unintended and unauthorized entities from deciphering the intercepted information. Typically, the information is encrypted using symmetric key cryptography, in which a transmitting device (referred to hereinafter as the "server") and an intended receiving device (referred to hereinafter as the "client") share a secret encryption key that is used by the server to encrypt the information and by the client to decrypt the information.

Before symmetric key cryptography can be used to provide secure communication over the communication network, it is necessary for both the sever and the client to possess the shared secret encryption key. One way to distribute the secret encryption key to both the server and the client is to manually enter the secret encryption key into both the server and the client. Unfortunately, a manual key distribution scheme is typically impractical because the server and the client are usually in remote locations. Also, the manual key distribution scheme is generally too time-consuming to be useful for on-line transactions. Furthermore, the manual key distribution scheme is typically considered to be insecure because the secret encryption key is necessarily disclosed to a third party.

A more common way to distribute the secret encryption key to both the server and the client is through a key exchange mechanism performed by the server and the client. The key exchange mechanism permits the server and the client to exchange the secret encryption key over the communication network without any third party intervention, and without compromising the secret encryption key. A commonly used key exchange mechanism requires the server to randomly select the secret encryption key and transmit the secret encryption key to the client using a key exchange protocol. It is important for the key exchange mechanism to work even when communication over the communication network is unreliable. Thus, the key exchange mechanism must work even when there is no guarantee that all messages transmitted by the server will reach the client.

Of course, the secret encryption key is only one type of information that needs to be exchanged between the server and the client. Other types of information, for example, status and control information, may also need to be exchanged between the server and the client. Again, it is important for any such information (referred to hereinafter generically as a "secret," although the information may be secret or non-secret information) to be successfully exchanged even when communication over the communication network is unreliable.

Thus, a need has remained for a technique for exchanging a secret over an unreliable communication network.

SUMMARY OF THE INVENTION

In accordance with one aspect of the invention, threshold cryptography (secret sharing) is used for exchanging a secret between a server and a client over an unreliable communication network. Specifically, a secret is computationally divided into N shares using a threshold encryption scheme such that any M of the shares (M less than or equal to N) can be used to reconstruct the secret. The N shares are spread over a number of transmitted messages, with the assumption that some number of the messages including a total of at least M shares will be received by the client. Upon receiving at least M shares, the client uses the at least M shares to reconstruct the secret using the threshold encryption scheme.

In accordance with another aspect of the invention, threshold cryptography (secret sharing) is used for encryption key exchange between a server and a client over an unreliable communication network. Specifically, a secret encryption key K is computationally divided into N shares using a threshold encryption scheme such that any M of the shares (M less than or equal to N) can be used to reconstruct the secret encryption key K. The N shares are spread over a number of transmitted messages, with the assumption that some number of the messages including a total of at least M shares will be received by the client. Upon receiving at least M shares, the client uses the at least M shares to reconstruct the secret encryption key using the threshold encryption scheme.

In accordance with yet another aspect of the invention, threshold cryptography (secret sharing) is used for encryption key exchange between a multicast server and a multicast client over multicast communication network, and specifically over a multicast communication network utilizing a layered reliable multicast scheme. Specifically, a secret encryption key K is computationally divided into N shares using a threshold encryption scheme such that any M of the shares (M less than or equal to N) can be used to reconstruct the secret encryption key K. The N shares are spread over a number of layers of a layered reliable multicast transmission, with the assumption that some number of the layers including a total of at least M shares will be received by the client. Upon receiving at least M shares, the client uses the at least M shares to reconstruct the secret encryption key using the threshold encryption scheme.

In a typical embodiment, the shares are encrypted prior to transmission by the server and decrypted by the client prior to reconstructing the secret. The shares may be encrypted using any number of encryption algorithms, typically using as the encryption key either a master key or a prior secret encryption key.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

The present invention utilizes threshold cryptography (also referred to as "secret sharing") to distribute a secret, such as the secret encryption key, over the unreliable communication network.

Threshold cryptography (secret sharing) has traditionally been used to prevent any one entity from reconstructing a secret (for example, a missile launch code, a bank vault combination, or a computer password) without the cooperation of other entities. Therefore, the secret is computationally divided into N parts (referred to hereinafter as "shares") in such a way that any M of the shares (M less than or equal to N) can be used to reconstruct the secret, but fewer than M shares cannot be used to reconstruct the secret. Each entity is given one or more shares, but less than M shares, of the secret. Any number of entities having at least M shares between them can cooperate to reconstruct the secret, but, more importantly, no part of the secret can be compromised without at least M shares.

The present invention utilizes threshold cryptography (secret sharing) to solve the inverse problem, that is, the problem of distributing the entire secret (such as the secret encryption key) to the client over an unreliable communication network. Here, the intention is for the client to receive a sufficient number of shares (i.e., at least M shares) so that the client can reconstruct the secret. Thus, the server selects a secret and computationally divides the secret into N shares in such a way that any M of the shares (M less than or equal to N) can be used to reconstruct the secret. The server then transmits the N shares to the client by spreading the N shares over a number of transmitted messages, with the assumption that the client will correctly receive some number of the messages including at least M shares. Typically, the server includes one share in each of N messages, with the assumption that the client will correctly receive at least M messages and therefore at least M shares. Upon receiving at least M shares, the client uses the at least M shares to reconstruct the secret. Thus, the secret is successfully exchanged if the client receives at least M shares, but is not exchanged if the client receives fewer than M shares.

This novel technique for exchanging a secret over an unreliable communication network is particularly useful for distributing the secret to multiple clients over a multicast communication network. In the multicast communication network, the multicast server transmits multicast information simultaneously to a number of multicast clients (referred to hereinafter as a "multicast group"). Specifically, in order to transmit one unit of the multicast information to each of the multicast clients in the multicast group, the multicast server transmits the unit of multicast information to the entire multicast group over the multicast communication network. Each multicast client monitors the multicast communication network to receive the multicast transmissions.

Figure 1:
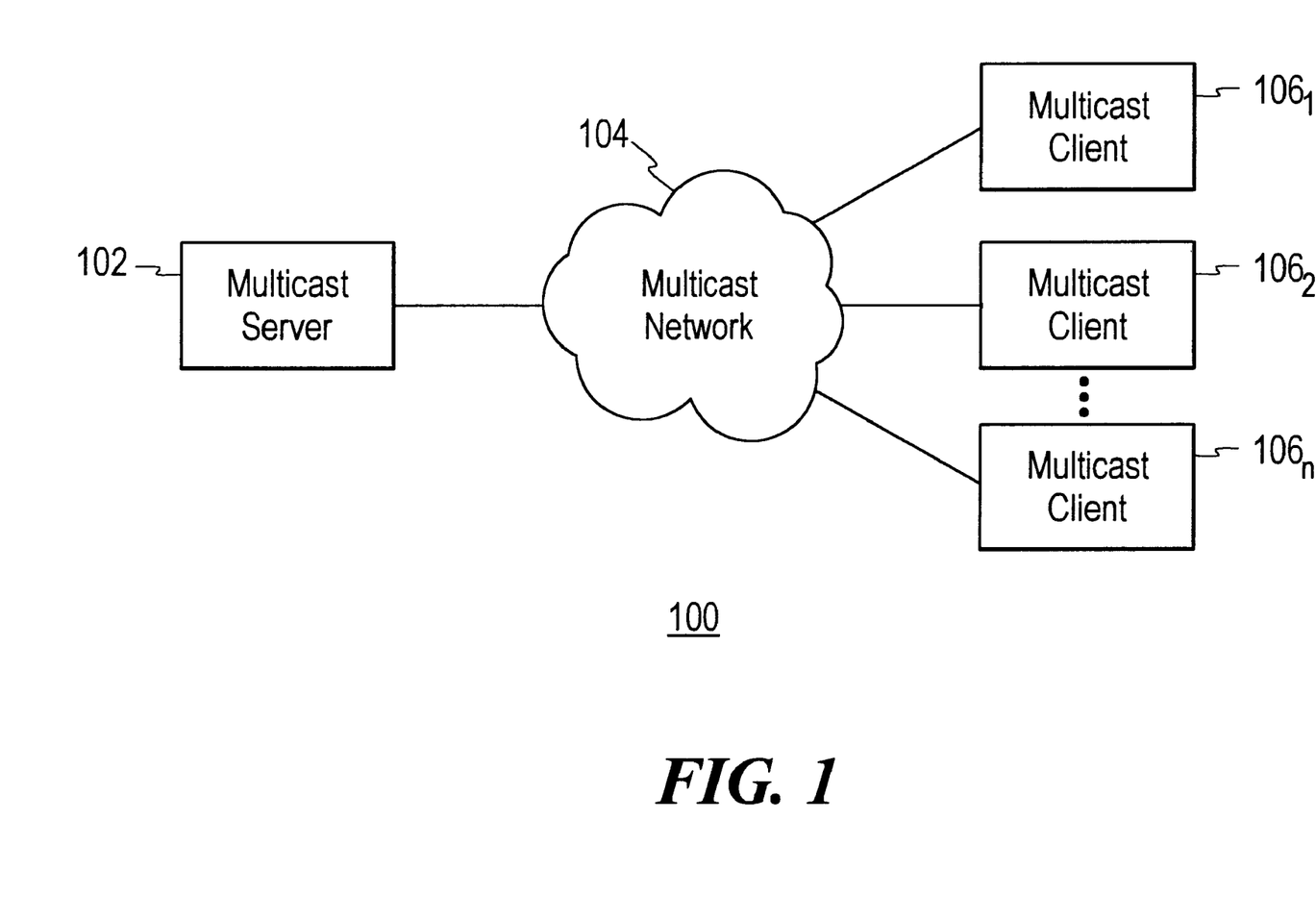
FIG. 1 is a block diagram showing a multicast communication system in accordance with a preferred embodiment of the present invention.

FIG. 1 shows an exemplary multicast communication system 100 in accordance with a preferred embodiment of the present invention. The multicast communication system 100 includes a multicast server 102 in communication with a number of multicast clients $106_1$ through $106_n$ (referred to individually as a "multicast client 106" and collectively as "multicast clients 106") over a multicast network 104.

In the multicast communication system 100, it is desirable for each multicast client 106 to receive all of the multicast information. Therefore, a layered reliable multicast scheme is often used to increase the probability that each multicast client 106 will receive all of the multicast information transmitted by the multicast server 102. Specifically, each unit of multicast information is sent to the multicast group over multiple multicast sessions (referred to hereinafter as "layers") in such a way that each multicast client 106 need only receive a subset of the layers (i.e., at least a predetermined minimum number of the layers) to recover the entire unit of multicast information. More specifically, the multicast server 102 transmits each unit of multicast information over N multicast sessions within the multicast network 104, where each multicast session represents one layer in the layered reliable multicast scheme. Each multicast client 106 is configured to receive at least M, but typically all N, of the multicast sessions (layers). Each multicast client 106 reconstructs an entire unit of multicast information upon receiving at least M layers of the layered reliable multicast transmission.

In one layered reliable multicast scheme, the multicast server 102 simply repeats each unit of multicast information at each layer of the layered reliable multicast transmission. In such a layered reliable multicast scheme, each multicast client 106 only needs to receive one layer of the layered reliable multicast transmission in order to recover the entire unit of multicast information.

In another layered reliable multicast scheme, in which each layered reliable multicast transmission comprises N layers, an error correcting code is used to allow each multicast client 106 to recover the entire unit of multicast information based on any M layers (M less than or equal to N) of the layered reliable multicast transmission. Specifically, the multicast server 102 encodes each unit of multicast information using an error correcting code, such as a Reed-Solomon block error correcting code, and divides the encoded unit of multicast information into N equal size segments. The power of the error correcting code is selected such that the entire unit of multicast information can be recovered from the encoded information of any M segments. The multicast server transmits one segment in each of the N layers of the layered reliable multicast transmission. Upon receiving any M layers of the layered reliable multicast transmission, each multicast client 106 decodes the received segments to recover the entire unit of multicast information. In the case of a Reed-Solomon block error code, any missing segments are simply treated as being block errors that can be recovered by the Reed-Solomon decoder.

In the multicast communication system 100, it is also desirable for the multicast server 102 to prevent unauthorized multicast clients (i.e., multicast clients not in the multicast group) from accessing the multicast information. Therefore, encryption is often used to prevent unauthorized multicast clients from accessing the multicast information. Specifically, the multicast server 102 and the multicast clients 106 share a common secret encryption key. The multicast server 102 encrypts the multicast information using the secret encryption key prior to transmitting the multicast information to the multicast group. Upon receiving the encrypted multicast information, the authorized multicast clients 106 decrypt the multicast information using the secret encryption key to obtain the multicast information. Any unauthorized multicast clients that receive the encrypted multicast information are unable to decrypt the multicast information and are therefore unable to utilize the multicast information.

A preferred embodiment of the present invention combines threshold cryptography (secret sharing) with the layered reliable multicast scheme to distribute the secret encryption key over the multicast network 104. Specifically, the multicast server 102 selects a secret encryption key K, and computationally divides the secret encryption key K into N shares using a threshold encryption scheme such that any M shares (M less than or equal to N) can be used to reconstruct the secret encryption key K. The multicast server 102 then transmits a different one of the N shares in each layer of a layered reliable multicast transmission, with the assumption that each multicast client 106 will correctly receive at least M layers (and therefore at least M shares) of the layered reliable multicast transmission. Upon receiving the at least M shares, each multicast client 106 uses the at least M shares it receives to reconstruct the secret encryption key K using the threshold encryption scheme. It is worth noting that any entity, including a multicast client 106, that receives fewer than M shares is unable to reconstruct the secret encryption key K or even reconstruct any part of the secret encryption key K (a fact that distinguishes the threshold encryption scheme from a forward error correction scheme, such as a Reed-Solomon block error correction scheme, in which partial information may be recoverable even though an entire block is unrecoverable).

In order to provide a secure key exchange mechanism using threshold cryptography (secret sharing) in combination with the layered reliable multicast scheme, each share is encrypted by the multicast server 102 before it is inserted into a layer of the layered reliable multicast transmission. Each share may be encrypted using any of a number of symmetric key encryption algorithms, including both block ciphers and stream ciphers, or public key encryption algorithms. In the case of a symmetric key encryption algorithm, the encryption key may be a master key that is shared by both the multicast server 102 and the multicast clients 106 for use specifically during key exchanges, or, in the case of a key update, may be a prior secret encryption key shared by the multicast server 102 and the multicast clients 106. In either case, each multicast client 106 must decrypt each of the at least M shares before it can reconstruct the secret encryption key K.

Figure 2:
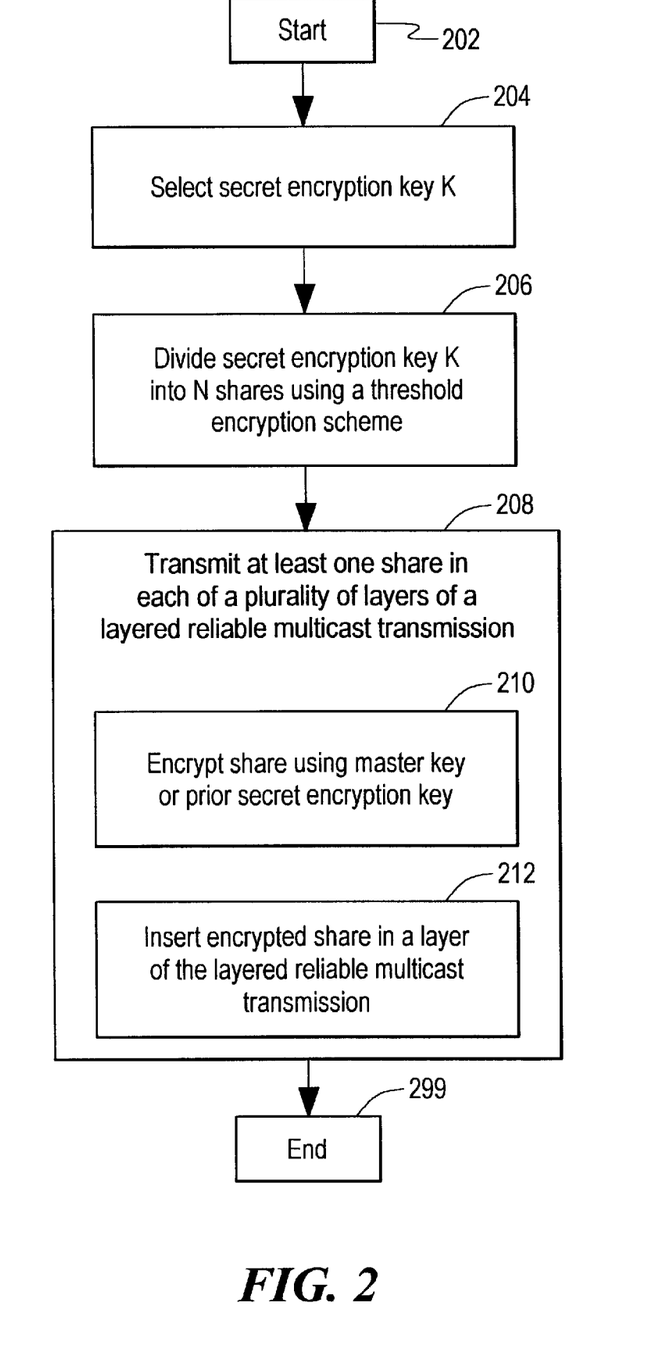
FIG. 2 is a logic flow diagram showing exemplary multicast server logic for encryption key exchange using threshold cryptography (secret sharing) over a layered reliable multicast scheme in accordance with a preferred embodiment of the present invention.

Thus, the preferred multicast server 102 includes logic for performing the steps shown in FIG. 2. The logic begins in step 202, and proceeds to select the secret encryption key K, in step 204. The logic then divides the secret encryption key K into N shares using the threshold encryption scheme, in step 206, such that any M of the shares (M less than or equal to N) can be used to reconstruct the secret encryption key K. The logic then transmits one share in each of a plurality of layers of a layered reliable multicast transmission, in step 208, specifically by encrypting the share (step 210) and inserting the encrypted share in a layer of the layered reliable multicast transmission (step 212). The logic terminates in step 299.

Figure 3:
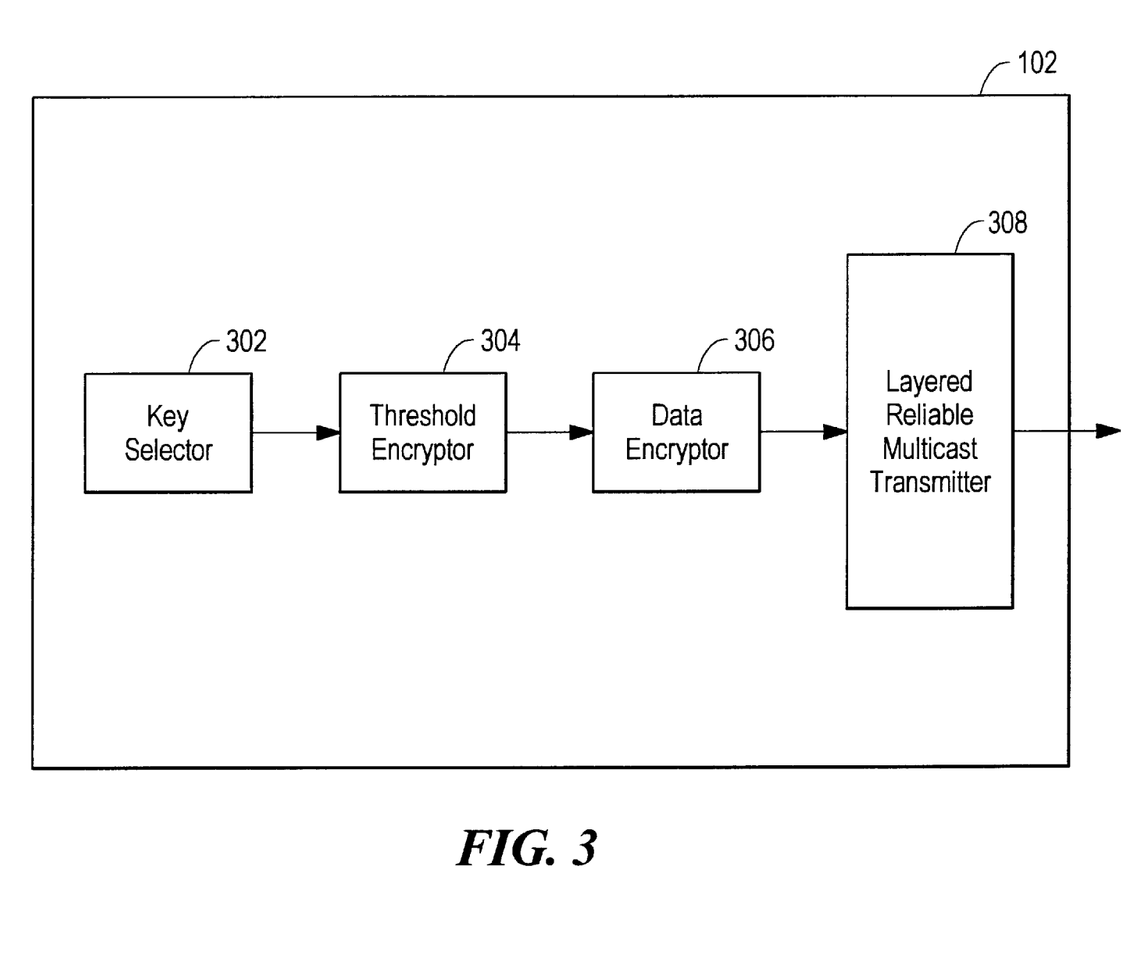
FIG. 3 is a block diagram showing the relevant logic blocks of the multicast server for encryption key exchange using threshold cryptography (secret sharing) over a layered reliable multicast scheme in accordance with a preferred embodiment of the present invention.

FIG. 3 is a block diagram showing the relevant logic blocks of the multicast server 102 for encryption key exchange using threshold cryptography (secret sharing) over a layered reliable multicast scheme. The multicast server 102 includes a Key Selector 302 for selecting the secret encryption key K, typically by generating random or pseudo-random numbers. The Key Selector 302 sends the secret encryption key K to a Threshold Encryptor 304, which divides the secret encryption key K into N shares using the threshold encryption scheme such that any M of the shares (M less than or equal to N) can be used to reconstruct the secret encryption key K. The shares are sent to a Data Encryptor 306, which encrypts the shares, for example, using a master key or a prior secret encryption key. The encrypted shares are sent to a Layered Reliable Multicast Transmitter, which inserts the encrypted shares into the layers of a layered reliable multicast transmission according to a predetermined insertion scheme, preferably by including one encrypted share in each layer of the layered reliable multicast transmission, although alternative embodiments may include zero, one, or more encrypted shares in particular layers of the layered reliable multicast transmission.

Each multicast client 106 monitors the multicast network 104 for a layered reliable multicast transmission, and specifically for the various layers of the layered reliable multicast transmission. Each layer of the layered reliable multicast transmission preferably includes one encrypted share of the secret encryption key K in accordance with the threshold encryption scheme, although alternative embodiments may include zero, one, or more encrypted shares in particular layers of the layered reliable multicast transmission. Upon receiving a layer of the layered reliable multicast transmission, the multicast client 106 extracts any encrypted shares from the received layer, and decrypts the encrypted shares. Upon receiving at least a predetermined minimum number M shares, the multicast client 106 reconstructs the secret encryption key from the at least M shares using the threshold encryption scheme.

Figure 4:
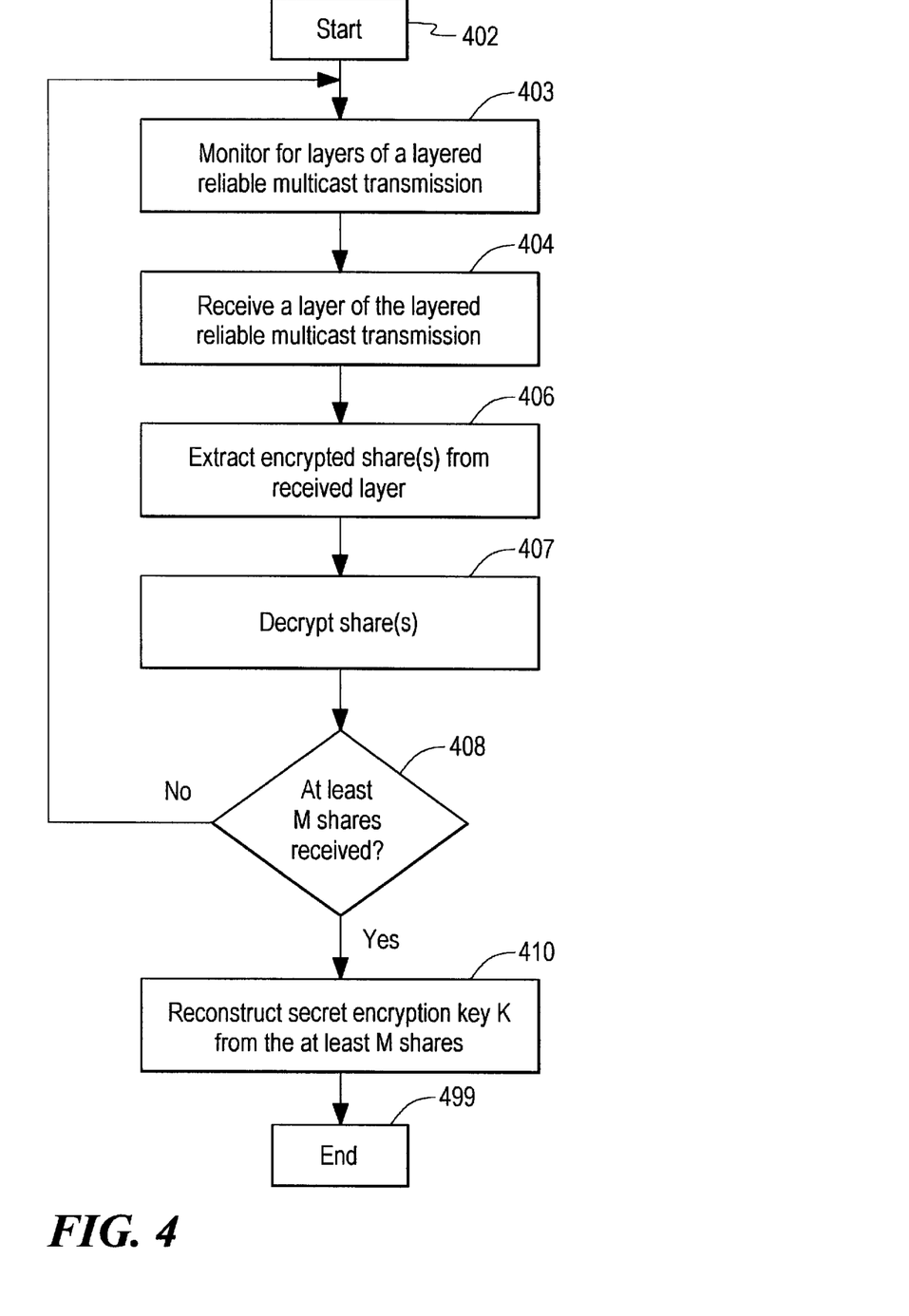
FIG. 4 is a logic flow diagram showing exemplary multicast client logic for encryption key exchange using threshold cryptography (secret sharing) over a layered reliable multicast scheme in accordance with a preferred embodiment of the present invention.

Thus, the preferred multicast client 106 includes logic for performing the steps shown in FIG. 4. The logic begins in step 402 and proceeds to monitor the multicast network 104 for a layered reliable multicast transmission, and specifically for the various layers of the layered reliable multicast transmission including the encrypted shares of the secret encryption key K, in step 403. Upon receiving a layer of a layered reliable multicast transmission, in step 404, the logic extracts any encrypted shares from the received layer, in step 406, and decrypts the encrypted shares, in step 407. The logic then determines whether a predetermined minimum number M shares have been received, in step 408. If fewer than M shares have been received (NO in step 408), then the logic recycles to step 403 and continues monitoring for layers of the layered reliable multicast transmission. If at least M shares have been received (YES in step 408), then the logic reconstructs the secret encryption key K from the at least M shares using the threshold encryption scheme, in step 410. The logic terminates in step 499.

Figure 5:
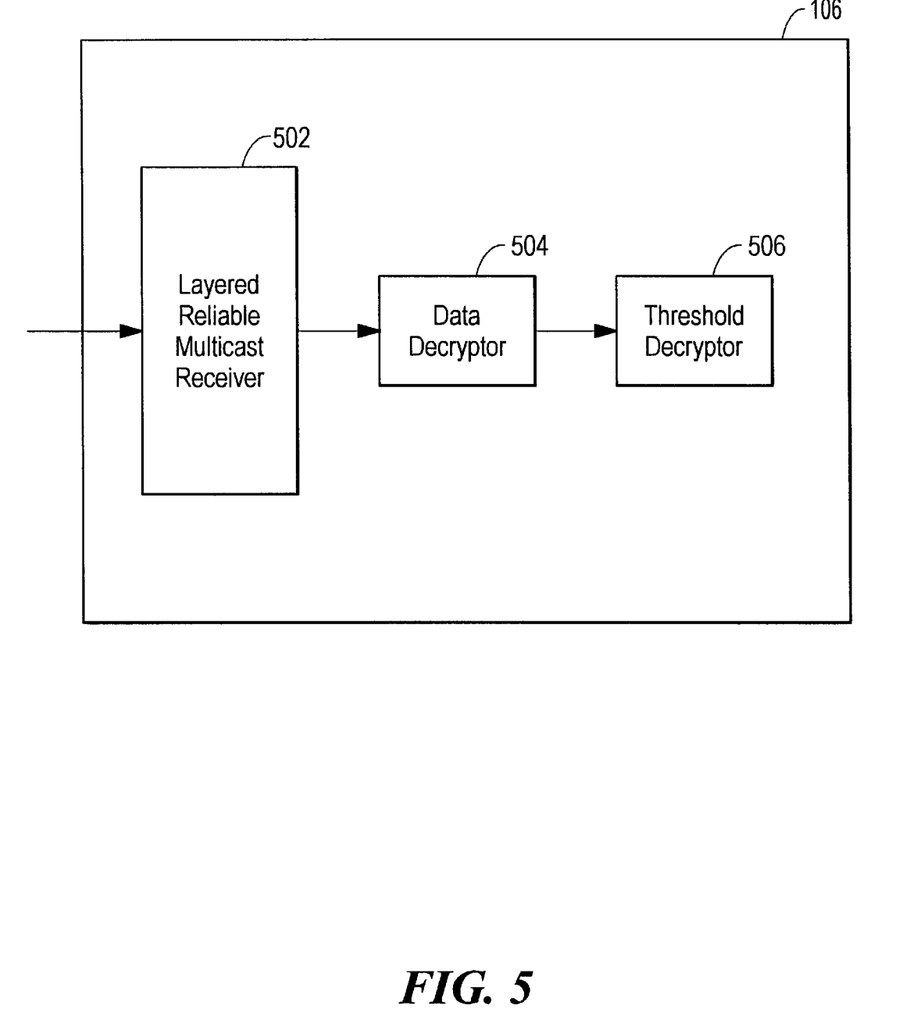
FIG. 5 is a block diagram showing the relevant logic blocks of the multicast client for encryption key exchange using threshold cryptography (secret sharing) over a layered reliable multicast scheme in accordance with a preferred embodiment of the present invention.

FIG. 5 is a block diagram showing the relevant logic blocks of the multicast client 106 for encryption key exchange using threshold cryptography (secret sharing) over a layered reliable multicast scheme. The multicast client 106 includes a Layered Reliable Multicast Receiver 502 that is operably coupled to monitor the multicast network 104 for a layered reliable multicast transmission, and specifically for the various layers of the layered reliable multicast transmission including the encrypted shares of the secret encryption key K. Encrypted shares received by the Layered Reliable Multicast Receiver 502 are sent to a Data Decryptor 504, which decrypts the encrypted shares, for example, using a master key or a prior secret encryption key. The decrypted shares are sent to a Threshold Decryptor 506, which reconstructs the secret encryption key K from a predetermined minimum number M shares using the threshold encryption scheme.

A simple threshold (secret sharing) scheme, referred to as the LaGrange Interpolating Polynomial scheme and discussed by Bruce Schneier in his book entitled *Applied Cryptography: Protocols, Algorithms, and Source Code in C, Second Edition*, published by John Wiley & Sons, Inc. 1996, (pages 71–73 and 528–531 of which are hereby incorporated by reference in their entirety), is used herein to describe an exemplary embodiment of the present invention. In the LaGrange Interpolating Polynomial scheme, the multicast server 102 obtains each of the N shares by evaluating an arbitrary polynomial X at a particular point and taking the remainder modulo p, where the arbitrary polynomial X includes the new secret encryption key K as one if its coefficients. The multicast server 102 includes, in each of the N layers of the layered reliable multicast transmission, one share along with the particular point that was used to obtain the share. Upon receiving at least M shares, each multicast client 106 reconstructs the new secret encryption key K by solving a set of M linear equations.

Eq. 1 shows the function F(x) in accordance with the LaGrange Interpolating Polynomial scheme. The arbitrary polynomial X is a polynomial of degree (M−1), which is described in greater detail below. The modulus p is a prime number that is larger than the number of possible shares N and larger than K.

$$F(x)=X \bmod p \qquad \text{Eq. 1}$$

Eq. 2 shows an exemplary polynomial X of degree (M−1) having the least significant coefficient equal to the value K. The coefficients a through z are selected arbitrarily by the multicast server 102, and are kept secretly by the multicast server 102.

$$X=ax^{M-1}+bx^{M-2}+ \ldots +zx+K \qquad \text{Eq. 2}$$

Each share $k_i$ is obtained by evaluating F(x) at a particular point $x_i$, as shown in Eq. 3.

$$k_i=F(x_i) \qquad \text{Eq. 3}$$

For example, the N shares may be obtained by evaluating F(x) for all values of x from one (1) to N, inclusive, as shown in Eq. 4.

$$k_i=F(x_{i-i})_{\text{for } i=1 \text{ to } N} \qquad \text{Eq. 4}$$

The multicast server 102 then sends the values $k_i$ and $x_i$ in layer i of the layered reliable multicast transmission. The multicast server 102 may also include the value p in each layer of the layered reliable multicast transmission, particularly if the multicast server 102 selects new values of p dynamically.

Upon receiving at least M layers of the layered reliable multicast transmission, each multicast client 106 reconstructs the new secret encryption key K by solving a set of M linear equations, where each of the M linear equations is represented by the linear equation shown in Eq. 5. Specifically, each multicast client 106 solves the set of linear equations using the at least M shares it receives, and by doing so obtains the values for the coefficients a through z (which, in this example, are unused) as well as the value K.

$$(ax_i^{M-1}+bx_i^{M-2}+ \ldots +zx_i+K) \bmod p=k_i \qquad \text{Eq. 5}$$

The concepts of the LaGrange Interpolating Polynomial scheme can be demonstrated by the following example in which at least three (3) shares are required in order to recover the new secret encryption key K (i.e., M=3). Thus, the arbitrary polynomial X is a quadratic polynomial, as shown in Eq. 6.

$$F(x)=(ax^2+bx+K) \bmod p \qquad \text{Eq. 6}$$

In order to effect a key exchange with the multicast clients 106, the multicast server 102 randomly selects the values a, b, K, and p such that p is a prime number greater than K and also greater than the number of shares N to be calculated. Eq. 7 shows an exemplary function F(x) with a=7, b=8, K=11, and p=13.

$$F(x)=(7x^2+8x+11) \bmod 13 \qquad \text{Eq. 7}$$

The multicast server 102 then obtains one share for each of the N layers in the layered reliable multicast transmission by evaluating F(x) at N distinct points, for example, for all values of x from one (1) to N, inclusive. Assuming that there are five (5) layers in the layered reliable multicast transmission (i.e., N=5), then the multicast server 102 typically calculates five (5) shares as shown in Eqs. 8 through 12.

$$k_1=F(x_1=1)=(7+8+11) \bmod 13=0 \qquad \text{Eq. 8}$$

$$k_2=F(x_2=2)=(28+16+11) \bmod 13=3 \qquad \text{Eq. 9}$$

$$k_3=F(x_3=3)=(63+24+11) \bmod 13=7 \qquad \text{Eq. 10}$$

$$k_4=F(x_4=4)=(112+32+11) \bmod 13=12 \qquad \text{Eq. 11}$$

$$k_5=F(x_5=5)=(175+40+11) \bmod 13=5 \qquad \text{Eq. 12}$$

The multicast server 102 then sends the values $k_i$ and $x_i$ in layer i of the layered reliable multicast transmission. For example, the multicast server 102 may send the values (k=0, x=1) a first layer of the layered reliable multicast transmisson, (k=3, x=2) in a second layer of the layered reliable multicast transmisson, (k=7, x=3) in a third layer of the layered reliable multicast transmisson, (k=12, x=4) in a fourth layer of the layered reliable multicast transmisson, and (k=5, x=5) in a fifth layer of the layered reliable multicast transmisson. The multicast server 102 may also include the value p in each layer of the layered reliable multicast transmission, particularly if the multicast server 102 selects new values of p dynamically. In any case, the multicast clients 106 must either know the value p a priori or else be informed of the value p by some means in order for the key exchange to be completed.

Assuming, for example, that a particular multicast client 106 receives only layers 2, 3, and 5 of the layered reliable multicast transmission (and therefore receives only shares $k_2$, $k_3$, and $k_5$ and the corresponding values $X_2$, $X_3$, and $X_5$), then the multicast client 106 solves the set of linear equations shown in Eqs. 13 through 15.

$$(4a+2b+K) \bmod 13=3 (\text{i.e., } k=3 \text{ and } x=2) \qquad \text{Eq. 13}$$

$$(9a+3b+K) \bmod 13=7 (\text{i.e., } k=7 \text{ and } x=3) \qquad \text{Eq. 14}$$

$(25a+5b+K) \mod 13 = 5$ (i.e., k=5 and x=5)   Eq. 15

The solution to the set of linear equations is a=7, b=8, and K=11. Thus, the multicast client 106 is able to reconstruct the new secret encryption key K equal to eleven (11) based upon only the three (3) received shares.

An alternate embodiment of the present invention improves the security of the key exchange mechanism by having different servers transmit the various layers of the layered reliable multicast transmission. For example, the key exchange mechanism of the present invention may be applied to a shared-tree multicast system utilizing core based trees such that each layer of the layered reliable multicast transmission is transmitted by a different "core" of the shared tree. In this way, each layer traverses a different path within the multicast network 104, making it more difficult for an intruder to intercept and decipher a sufficient number of layers of the layered reliable multicast transmission.

Of course, the present invention is not limited to encryption key exchange. Any secret, or even non-secret, information may be exchanged using threshold cryptography (secret sharing) over an unreliable network as taught herein. Therefore, the term "secret" as used herein is not limited to secret information, but instead refers generally to the information exchanged between the server and the client using the techniques taught herein, which can include, but is not limited to, a secret encryption key.

In a preferred embodiment of the present invention, the threshold encryption scheme is used to divide the secret into N shares, which are then encrypted prior to being inserted into the plurality of messages, for example, using a master key or a prior secret encryption key in conjunction with a symmetric key encryption algorithm. However, in an alternative embodiment, the threshold encryption scheme may utilize the master key or the prior secret encryption key to create the shares, such that the shares need not be subsequently encrypted prior to being inserted into the plurality of messages.

Although the preferred embodiment of the present invention utilizes threshold cryptography (secret sharing) over a layered reliable multicast network, the present invention is in no way limited to a layered reliable multicast network. The present invention may be used in communication networks using unicast, multicast, or broadcast transmissions. Also, the various shares may be transmitted in different frames in a frame-switched communication network (for example, frame relay), in different packets in a packet-switched communication network (for example, Internet Protocol), in different cells in a cell-switched communication network (for example, Asynchronous Transfer Mode), in different multiplexed subchannels over a multiplexed communication channel, in different communication channels within a communication network, or in any of a number of other communication networks as will be apparent to a skilled artisan.

The LaGrange Interpolating Polynomial scheme is used herein for example only. The present invention is in no way limited to the use of the LaGrange Interpolating Polynomial scheme. Other threshold cryptography (secret sharing) schemes can be used in place of the LaGrange Interpolating Polynomial scheme in alternative embodiments of the present invention.

In a preferred embodiment of the present invention, predominantly all of the multicast server logic described with reference to FIG. 2 is implemented as a set of computer program instructions that are stored in a computer readable medium and executed by an embedded microprocessor system within the multicast server 102, and predominantly all of the multicast client logic described with reference to FIG. 4 is implemented as a set of computer program instructions that are stored in a computer readable medium and executed by an embedded microprocessor system within the multicast client 106. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for transmitting a secret to a client over an unreliable communication network, the method comprising the steps of:

dividing the secret into a predetermined number N shares using a threshold encryption scheme such that at least a predetermined minimum number M shares, but no more than the predetermined number N shares, are needed to reconstruct the secret using the threshold encryption scheme; and transmitting to the client a plurality of messages including at least one share in each of said plurality of messages.

2. The method of claim 1 wherein the unreliable communication network comprises a layered reliable multicast network and wherein the method comprises the steps of:

dividing the secret into the N shares; and transmitting at least one share in each of a plurality of layers of a layered reliable multicast transmission.

3. The method of claim 2 wherein the layered reliable multicast transmission comprises at least N layers and wherein the method comprises the steps of:
  dividing the secret encryption key into the N shares; and
  transmitting a different one of the N shares in each of N layers of the layered reliable multicast transmission.

4. The method of claim 2 further comprising the step of encrypting each of the N shares prior to transmitting.

5. The method of claim 4 wherein the step of encrypting each of the N shares comprises encrypting each of the N shares using a master key.

6. The method of claim 4 wherein the step of encrypting each of the N shares comprises encrypting each of the N shares using a prior secret encryption key.

7. An apparatus for transmitting a secret to a client over an unreliable communication network, the apparatus comprising:
  a threshold encryptor operably coupled to divide the secret into a predetermined number N shares using a predetermined threshold encryption scheme such that at least a predetermined minimum number M shares, but no more than the predetermined number N shares, are needed to reconstruct the secret using the threshold encryption scheme; and
  transmitting logic operably coupled to transmit a plurality of messages to the client including at least one share in each of said plurality of messages.

8. The apparatus of claim 7 wherein the unreliable communication network comprises a layered reliable multicast network and wherein the apparatus comprises:
  the threshold encryptor operably coupled to divide the secret encryption key into the N shares; and
  a layered reliable multicast transmitter responsive to the threshold encryptor and operably coupled to transmit at least one share in each of a plurality of layers of a layered reliable multicast transmission.

9. The apparatus of claim 8 wherein the layered reliable multicast transmission comprises at least N layers and wherein the layered reliable multicast transmitter is operably coupled to transmit a different one of the N shares in each of N layers of the layered reliable multicast transmission.

10. The apparatus of claim 8 further comprising a data encryptor operably coupled between the threshold encryptor and the layered reliable multicast transmitter, the data encryptor operably coupled to encrypt each of the shares and provide encrypted shares to the layered reliable multicast transmitter.

11. The apparatus of claim 10 wherein the data encryptor encrypts each of the N shares using a master key.

12. The apparatus of claim 10 wherein the data encryptor encrypts each of the N shares using a prior secret encryption key.

13. The apparatus of claim 1 comprising:
  means for dividing the secret into the N shares; and
  means for transmitting a plurality of messages to the client including at least one share in each of said plurality of messages.

14. The apparatus of claim 13 further comprising means for encrypting each of the N shares prior to transmitting.

15. A program product comprising a computer readable medium having embodied therein a computer readable program for transmitting a secret to a client over an unreliable communication network, the computer readable program comprising:
  threshold encryption logic programmed to divide the secret into a predetermined number N shares using a predetermined threshold encryption scheme such that at least a predetermined minimum number M shares, but no more than the predetermined number N shares, are needed to reconstruct the secret using the threshold encryption scheme; and
  transmitting logic programmed to transmit a plurality of messages to the client including at least one share in each of said plurality of messages.

16. The program product of claim 15 wherein the unreliable communication network comprises a layered reliable multicast network and wherein the program product comprises:
  the threshold encryption logic programmed to divide the secret encryption key into the N shares; and
  layered reliable multicast transmitter logic programmed to transmit at least one share in each of a plurality of layers of a layered reliable multicast transmission.

17. The program product of claim 16 wherein the layered reliable multicast transmission comprises at least N layers and wherein the layered reliable multicast transmitter logic is programmed to transmit a different one of the N shares in each of N layers of the layered reliable multicast transmission.

18. The program product of claim 16 further comprising data encryption logic operably coupled between the threshold encryption logic and the layered reliable multicast transmitter logic and programmed to encrypt each of the shares and provide encrypted shares to the layered reliable multicast transmitter logic.

19. The program product of claim 18 wherein the data encryption logic is programmed to encrypt each of the N shares using a master key.

20. The program product of claim 18 wherein the data encryption logic is programmed to encrypt each of the N shares using a prior secret encryption key.

21. The program product of claim 15 comprising:
  computer readable program code means for dividing the secret into the N shares; and
  computer readable program code means for transmitting a plurality of messages to the client including at least one share in each of said plurality of messages.

22. The program product of claim 21 further comprising computer readable program code means for encrypting each of the N shares prior to transmitting.

23. A method for receiving a secret over an unreliable communication network, the method comprising the steps of:
  receiving a plurality of messages including in each message at least one share of the secret generated by a threshold encryption scheme; and
  reconstructing the secret using at least a predetermined minimum number M shares.

24. The method of claim 23 wherein the unreliable communication network comprises a layered reliable multicast network and wherein the method comprises the steps of:
  receiving a plurality of layers of a layered reliable multicast transmission including in each layer at least one share of the secret generated by a threshold encryption scheme; and
  reconstructing the secret using the at least M shares.

25. The method of claim 23 wherein each share is encrypted and wherein the method further comprises the step of decrypting each share prior to reconstructing the secret.

26. The method of claim 25 wherein the step of decrypting each share comprises decrypting each share using a master key.

27. The method of claim 25 wherein the step of decrypting each share comprises decrypting each share using a prior secret encryption key.

28. An apparatus for receiving a secret encryption key over an unreliable communication network, the apparatus comprising:
   receiving logic operably coupled to receive a plurality of messages including in each message at least one share of the secret generated by a threshold encryption scheme; and
   a threshold decryptor operably coupled to reconstruct the secret using at least a predetermined minimum number M shares.

29. The apparatus of claim 28 wherein the unreliable communication network comprises a layered reliable multicast network and wherein the apparatus comprises:
   a layered reliable multicast receiver operably coupled to receive a plurality of layers of a layered reliable multicast transmission including in each layer at least one share of the secret generated by the threshold encryption scheme; and
   the threshold decryptor operably coupled to reconstruct the secret using the at least M shares.

30. The apparatus of claim 28 wherein each share is encrypted and wherein the apparatus further comprises a data decryptor operably coupled to decrypt the shares received by the layered reliable multicast receiver and provide the decrypted shares to the threshold decryptor.

31. The apparatus of claim 30 wherein the data decryptor is operably coupled to decrypt each share using a master key.

32. The apparatus of claim 30 wherein the data decryptor is operably coupled to decrypt each share using a prior secret encryption key.

33. A program product comprising a computer readable medium having embodied therein a computer readable program for receiving a secret over an unreliable communication network, the computer readable program comprising:
   receiving logic programmed to receive a plurality of messages including in each message at least one share of the secret generated by a threshold encryption scheme; and
   threshold decryption logic programmed to reconstruct the secret using at least a predetermined minimum number M shares.

34. The program product of claim 33 wherein the unreliable communication network comprises a layered reliable multicast network and wherein the program product comprises:
   layered reliable multicast receiver logic programmed to receive a plurality of layers of a layered reliable multicast transmission including in each layer at least one share of the secret generated by the threshold encryption scheme; and
   the threshold decryption logic programmed to reconstruct the secret using the at least M shares.

35. The program product of claim 33 wherein each share is encrypted and wherein the program product further comprises data decryption logic programmed to decrypt the shares received by the layered reliable multicast receiver logic and provide the decrypted shares to the threshold decryption logic.

36. The program product of claim 35 wherein the data decryption logic is programmed to decrypt each share using a master key.

37. The program product of claim 35 wherein the data decryption logic is programmed to decrypt each share using a prior secret encryption key.

38. A method of exchanging a secret between a server and a client over an unreliable communication network, the method comprising the steps of:
   dividing, by the server, the secret into a predetermined number N shares using a threshold encryption scheme such that at least a predetermined minimum number M shares, but no more than the predetermined number N shares, are needed to reconstruct the secret using the threshold encryption scheme;
   transmitting, by the server to the client, a first number of messages including at least one share in each of said first number of messages;
   receiving, by the client, a second number of messages including at least one share in each of said second number of messages; and
   reconstructing, by the client, the secret using at least a predetermined minimum number M shares.

39. The method of claim 38 comprising the steps of:
   dividing, by the server, the secret into the N shares;
   encrypting, by the server, each of the N shares;
   transmitting, by the server to the client, a first number of messages including at least one encrypted share in each of said first number of messages;
   receiving, by the client, a second number of messages including at least one encrypted share in each of said second number of messages;
   decrypting, by the client, each of the encrypted shares received by the client; and
   reconstructing, by the client, the secret using the at least M shares.

40. The method of claim 38 wherein the unreliable communication network comprises a layered reliable multicast network and wherein the method comprises the steps of:
   dividing, by the server, the secret into the N shares;
   transmitting, by the server to the client, at least one share in each of a first number of layers of a layered reliable multicast transmission;
   receiving, by the client, a second number of layers of the layered reliable multicast transmission including at least one share in each of said second number of layers; and
   reconstructing, by the client, the secret using the at least M shares.

41. A system for exchanging a secret over an unreliable communication network, the system comprising a server in communication with at least one client over the unreliable communication network, wherein:
   the server is operably coupled to divide the secret into a predetermined number N shares using a threshold encryption scheme such that at least a predetermined minimum number M shares, but no more than the predetermined number N shares, are needed to reconstruct the secret using the threshold encryption scheme and transmit a first number of messages to the client including at least one share in each of said first number of messages; and
   the client is operably coupled to receive a second number of messages including at least one share in each of said second number of messages and reconstruct the secret using at least a predetermined minimum number M shares.

42. The system of claim 41, wherein:
   the server is operably coupled to divide the secret into the N shares, encrypt each of the shares, and transmit a first number of messages to the client including at least one encrypted share in each of said first number of messages; and the client is operably coupled to receive a second number of messages including at least one encrypted share in each of said second number of messages, decrypt each of the received shares, and reconstruct the secret using the at least M shares.

* * * * *